United States Patent
Desatoff

(10) Patent No.: US 6,634,316 B2
(45) Date of Patent: Oct. 21, 2003

(54) METHOD AND APPARATUS FOR RECIRCULATING FILTERED BIRD-BATH

(76) Inventor: George Desatoff, 16041 Quartz St., Westminister, CA (US) 92683

( * ) Notice: Subject to any disclaimer, the term of this patent is extended or adjusted under 35 U.S.C. 154(b) by 0 days.

(21) Appl. No.: 10/178,639

(22) Filed: Jun. 21, 2002

(65) Prior Publication Data
US 2003/0075113 A1 Apr. 24, 2003

Related U.S. Application Data

(60) Provisional application No. 60/339,064, filed on Oct. 22, 2001.

(51) Int. Cl.⁷ ............................................. A01K 45/00
(52) U.S. Cl. ..................................................... 119/69.5
(58) Field of Search ............................. 119/69.5, 74, 72

(56) References Cited

U.S. PATENT DOCUMENTS

| | | | | |
|---|---|---|---|---|
| 3,648,659 A | * | 3/1972 | Jones ........................ 119/69.5 |
| 4,309,962 A | * | 1/1982 | Boozer ........................ 119/74 |
| 4,630,569 A | * | 12/1986 | Dieleman ................... 119/69.5 |
| 5,931,118 A | * | 8/1999 | Thompson ................. 119/69.5 |
| 5,966,868 A | * | 10/1999 | Cox ........................... 119/69.5 |
| 6,079,951 A | * | 6/2000 | Morton ...................... 119/69.5 |
| 6,101,977 A | * | 8/2000 | Matz .......................... 119/74 |
| 6,253,709 B1 | * | 7/2001 | King .......................... 119/74 |

* cited by examiner

Primary Examiner—Charles T. Jordan
Assistant Examiner—Judith A. Nelson
(74) Attorney, Agent, or Firm—Jack Jmaev

(57) ABSTRACT

Bird bath incorporates water reservoir and filter disposed above reservoir. Pump circulates water from reservoir to a bowl. Water from bowl received from water surface directed to filter. Agitator causes particles in bowl bottom to be directed to filter. Cascading shower aerates water. Filter captures particles and sanitizes water.

16 Claims, 4 Drawing Sheets

METHOD AND APPARATUS FOR RECIRCULATING FILTERED BIRD-BATH

RELATED APPLICATIONS

This present application is related to a provisional application serial No. 60/339,064 filed on Oct. 22, 2001, entitled "METHOD AND APPARATUS FOR RECIRCULATING FILTERED BIRD-BATH", by G. Desatoff, currently pending, for which the priority date for this application is hereby claimed.

BACKGROUND OF THE INVENTION

1. Technical Field

This invention pertains to the field of birdbaths.

2. Description of the Prior Art

Birdbaths are not new. In fact, use of birdbaths as ornamental fixtures has become quite commonplace over the past few decades. The traditional birdbath comprises little more than a shallow bowl mounted on top of a pedestal. In this simple configuration, water is poured into the shallow bowl. Once the shallow bowl is filled with water, it is naturally attractive to non-domesticated birds. Those birds bathe in the water as well as consume water from the bowl.

As one might expect, water poured into the shallow bowl could easily become stagnant. This leads to the proliferation of harmful bacteria and the attraction of mosquitoes. These are just some of the undesirable aspects of the traditional birdbath.

The next step in birdbath evolution addressed the problem of water stagnating in the shallow bowl. That solution introduced a pump disposed in a reservoir of water to create a recirculating birdbath. These prior art recirculating birdbaths reduced the potential for water stagnation by constantly aerating the water supply.

Clearly, recirculating birdbaths helped to reduce water stagnation, but they were not entirely effective. One of the main reasons that recirculating birdbaths were not as effective as they could have been is that the water supply would accumulate organic waste left by birds using the birdbath. The organic waste would eventually decompose in the water supply; again rendering the water supply biologically hazardous.

Use of chlorine or other disinfectants was not a suitable means of sanitizing the water supply because sunlight often breaks down these compounds. And because the birds consume water from the birdbath, use of chemical disinfectants requires that the toxicity level of the compound be accurately controlled so that the birds visiting the birdbath would not be otherwise harmed.

The next inventive step in birdbath evolution comprised the introduction of a filter to help reduce the level of organic waste suspended in the water supply. The effectiveness of these filtered recirculating birdbaths was again less than expected. The reason for this was that the filters in these filtered recirculating birdbaths could not be easily cleaned because in many cases the filters are made integral to the pump assembly. Because the filters in these prior art birdbaths are so inaccessible, they are rarely cleaned. And even when these filters are cleaned, these filters are designed to capture particulate matter and do nothing to help sanitize or disinfect the water supply used in the birdbath.

One prior art design was conceived to prolong the useful operating life of the filter. In this prior art design, gravel was disposed in the base of the shallow bowl constituting the birdbath. The purpose of this gravel layer was to reduce the overall size of particulate matter deposited by birds using the birdbath. The gravel layer effectively helped to reduce the overall size of the particulate matter, but this really did not solve the problem at hand. The filter used to remove the particulate matter from the water supply would still become clogged over time. The only real benefit offered by the gravel layer was to prevent premature saturation of the filter due to excessively large particulate matter deposited in the water supply by defecating birds.

SUMMARY OF THE INVENTION

The present invention comprises a method for providing water to a birdbath comprising the steps of receiving water from a reservoir and directing the water under pressure to a birdbath bowl. According to this illustrative method, water may be received in the birdbath bowl where a bird may then use the water for bathing or internal consumption. The water may then be directed downward out of the bowl. Once the water leaves the bowl, one example method of the present invention provides that the water be directed to a filter that is disposed above the reservoir. Once the water is filtered, it may then be returned to the reservoir.

In order to provide more effective aeration of the water, one derivative method of the present invention provides that the water may be cascaded into a shower that may then be directed into the bowl. In yet another variation of the illustrative method, water in the bottom of the bowl may be agitated so that any particulate matter that may otherwise accumulate there may be forced out of the bowl. In yet another alternative method, water that is directed downward out of the bowl may be captured from a region proximate to the surface of the water that may be in the bowl.

The methods of the present invention may be embodied in a birdbath that also comprises the present invention. According to one example embodiment, a birdbath may comprise a bowl for holding water that a bird may enjoy. Water may be discharged out of the bowl in a manner such that it is directed downward away from the bowl. The birdbath may further comprise a pedestal for supporting the bowl. The pedestal itself may comprise a reservoir for holding a volume of water that may be used to replenish any water that is held in the bowl.

The pedestal, according to the illustrative embodiment taught here, further comprises a pump that may be used for drawing water from the reservoir and delivering it under pressure to the bowl. To recover water from the bowl, the pedestal comprises a filter that is disposed above the reservoir that may receive water emanating from the bowl and then direct the water to the reservoir.

According to one alternative embodiment of the present invention, the birdbath bowl may further comprise a sprinkler assembly. Typically, the sprinkler assembly receives water from the pump and creates a cascading shower that may be directed into the bowl. In yet another embodiment of the present invention, the birdbath bowl may further comprise an agitator jet. The agitator jet is typically directed in a manner that causes the water in the base of the bowl to become turbulent causing any particulate matter that may accumulate there to become suspended in the water that may be held in the bowl. In yet another alternative embodiment of this invention, the birdbath bowl may comprise a combined sprinkler-agitator assembly that is capable of creating the cascading shower and agitating the water that may be present in the bowl. In any of these example embodiment, the agitation may be accomplished by energy received from pressurized water that may be received from the pump comprising the pedestal of the present invention.

In some case, the agitator jet may need to be disposed below the water line of water that may be held in the bowl. In these cases, water that may be stored in the bowl may be siphoned back into the reservoir through the agitating jet. To prevent this undesirable effect, the present invention may further comprise a back-flow preventer. According to one example embodiment, the back-flow preventer may be disposed between the pump and the bowl.

In order to maintain a particular water level for any water that may be present in the bowl, the bowl may further comprise a return riser. The return riser serves to establish a water level for the water that may be held in the bowl and also causes water proximate to the water's surface to be expelled from the bottom of the bowl.

The filter, according to one embodiment of the present invention, may be particulate filter. In yet another alternative embodiment of the present invention, the filter comprises a sanitizing filter. One alternative embodiment of a pedestal comprises a filter slot that allows for easy access to the filter that is disposed above the reservoir.

Supporting the filter above the reservoir may be accomplished by using a filter support grate that may further comprise the pedestal. The support grate, which itself may be supported by a ledge integral to the pedestal, supports the filter above the reservoir. In some embodiments of the present invention, the pump may be supported above a sump region that may further comprise the reservoir. In such embodiments, the pump may be supported by a pump support grate. The pump support grate may itself be supported above the sump region by a ledge integral to the pedestal.

BRIEF DESCRIPTION OF THE DRAWINGS

The foregoing aspects are better understood from the following detailed description of one embodiment of the invention with reference to the drawings, in which.

DETAILED DESCRIPTION OF THE INVENTION

What is lacking in the known art is a method and apparatus to filter the water supply in a birdbath in a manner that is both convenient and sanitizes the water supply to prevent either stagnation or other forms of biological infestation. The present invention responds to these objectives. Generally, the present invention comprises a method for filtering water used in a birdbath by passing the water through a filter disposed above a reservoir of water. Once the water is filtered, it is returned to the reservoir. The act of filtering the water may comprise either removal of particulate matter from the water, sanitization of the water, or both.

The present invention comprises a method for receiving water from the reservoir, pressurizing the water and delivering the water to a bathing bowl. This step of delivering the water to bathing bowl may further comprises creating a cascading shower that helps to aerate the water supply.

The present invention may further comprise steps for agitating the water present in the bowl in order to cause particulate matter that may have accumulated at the base of the bowl to float to the surface level of the water present therein. This step helps particulate matter suspended in the water or accumulated in the base of the bowl to migrate toward filters disposed above the water reservoir.

Figures 1, 1A:
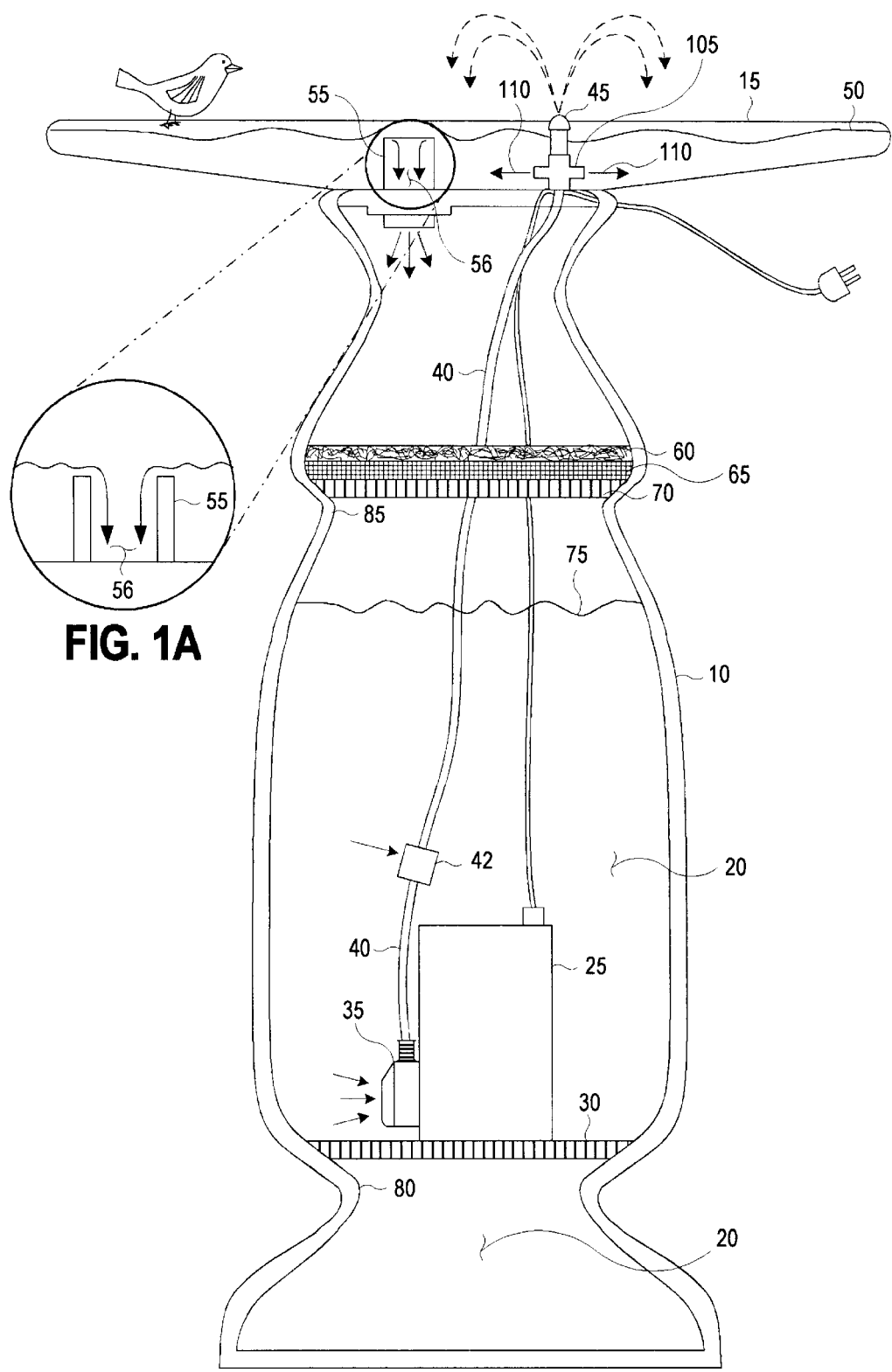
FIG. 1 is a cross-section of one illustrative embodiment of a birdbath according to the present invention.
FIG. 1A is a pictorial depiction of the capillary action found at the entry of a return riser comprising one example embodiment of the present invention.

FIG. 1 is a cross-section of one illustrative embodiment of a birdbath according to the present invention. In this illustrative embodiment, a birdbath comprises a pedestal 10 that is used to support a bowl 15. The pedestal 10 comprises the main reservoir 20 that is used to contain a volume of water. In this illustrative example, the main reservoir 20 is sized to accommodate five gallons of water. It should be noted, though, that the overall size of the birdbath can be varied according to specific architectural requirements or to accommodate specific application needs. Also, the bowl 15 and the pedestal 10 may be manufactured as one integral unit wherein alternative means for conveniently changing a filter can be provided. This type of alternative embodiment is described infra.

The cross-section of this illustrative embodiment depicts that a pump 25 is disposed in the volume of water contained in the reservoir 20. In some embodiments, the pump 25 is supported away from the bottom of the pedestal by a pump support grate 30. It should be noted that supporting the pump 25 away from the bottom of the pedestal 10 is entirely optional. The purpose of supporting the pump 25 away from the bottom of the pedestal 10 is to help preclude entry into the pump 25 of large particulate matter that may accumulate in the sump volume 22 of the pedestal 10. Many embodiments of a birdbath according to the present invention actually dispose the pump 25 at the bottom of the pedestal 10 directly in the sump volume 22. One such alternative example is described infra.

The pump 25 comprises a water intake 35. In operation, water from the main reservoir 20 enters the pump 25 through the water intake 35. The pump 25 imparts pressure onto the water and discharges the water through a pressure hose 40. The pressure hose 40 delivers pressurized water from the pump 25 to a sprinkler assembly 45. The pressurized water is discharged from the sprinkler assembly 45 to create a cascading shower of water. It should be noted that the sprinkler assembly 45 is purely optional and that any means to direct the pressurized water into the bowl 15 is an acceptable alternative embodiment of the present invention.

As water begins to fill the bowl 15, the level of the water in the bowl (depicted as the bowl-water-level 50) will rise to a height established by a return riser 55. The return riser 55 comprises a section of tubing that establishes a return-path 56 for water from the bowl 15 to return back into the pedestal 10. The return riser 55 continues downward through the base of the bowl 15 and allows water to fall back into the pedestal 10.

As water falls back into the pedestal 10, it encounters a particulate filter 60. The purpose of the particulate filter 60 is to remove contaminants from the water returning into the pedestal 10. Water passing through the particulate filter 60 encounters a sanitizing filter 65. The purpose of the sanitizing filter 65 is to neutralize biologically active matter suspended in the returning water. It should be noted that the illustrative embodiment described here comprises both the particulate filter 60 and the sanitizing filter 65. However, in other embodiments, the particulate filter 60 may not be provided and only the sanitizing filter 65 comprises the invention. In yet other embodiments, the sanitizing filter 65 may be omitted and the invention comprises only the particulate filter 60.

In this example embodiment of the present invention, the particulate filter 60 comprises a polyester filter akin to those commonly used in an air conditioning return path. It should be noted that any suitable material may be used to impeded the passage of particulate matter suspended in the returning water. Also in this example of embodiment, the sanitizing filter 65 comprises an activated-carbon filter commonly used to filter drinking water. Again, and in the true spirit of the present invention, any suitable sanitizing filter can be used to cleanse the water returning from the bowl 15.

Once the water passes the particulate filter 60, if such a particulate filter is provided for in a particular embodiment of the present invention, and once the water is sanitized by a sanitizing filter 65 in those embodiments of the present invention that comprise the sanitizing filter, the water is discharged back into the main reservoir 20 comprising the pedestal 10 of this example embodiment. In this example embodiment, either the particulate filter 60 and/or the sanitizing filter 65 are supported by a filter grate 70. The filter grate 70 is disposed slightly above the water level found in the main reservoir 20. The water level in the main reservoir 20 is referred to as the reservoir-water-level 75.

As already discussed, support grates are used to hold the pump 25 away from the sump volume 22 found in the lowest portion of the pedestal 10 and to fix either the particulate filter 60 and/or the sanitizing filter 65 above the reservoir-water-level 75. The pump support grate 30 is supported vertically around its perimeter by a first contoured ledge 80. The second contoured ledge 85 supports either filter above the reservoir-water-level 75. In this example embodiment, the pedestal 10 comprises contoured ledges because the contoured ledges result in an aesthetically pleasing contoured profile at the pedestal's 10 external surface.

It should be noted that any means to support either the pump support grate 30 or the filter support grate 70 can be used in alternative embodiments of the present invention. It should also be noted that any supporting means used to support the pump support grate 30 or the filter support grate 70 need not necessarily support these grates around their entire perimeter. As an additional note, the example embodiment described here suggests that a pedestal and shallow bowl 15 is circular. The present invention should not be limited in scope to any particular geometric shapes that may comprise a birdbath according to the present invention.

Again referring to FIG. 1, birds 100 visiting the birdbath may bathe in the water or they may drink water found in the bowl 15. As birds made do, biological wastes may be deposited in the water found in the bowl 15. Particulate matter, i.e. excrement, will inevitably be deposited in the bowl 15. Some particulate matter may float to the surface of the water found in the bowl 15 and other particulate matter may collect at the bottom of the bowl 15. To prevent the collection of particulate matter at the bottom of the bowl 15, the invention may further comprise an agitating jet 105 that emit a strong stream of water 110 toward the bottom of the bowl 15. This strong stream of water 110 agitates the particulate matter collecting at the bottom of the bowl 15 forcing it to the water's surface. It should be noted that the present invention may comprise one or more agitating jets 105.

One disadvantage exhibited by the invention in a configuration comprising an agitating jet 105 is siphon-drainage of the bowl 15 when the pump 25 is turned off. In the absence of the agitating jet 105, the water level and the bowl will be maintained at the height of the return riser 55 when the pump 25 is turned off. In most example embodiments that comprise an agitating jet 105, the agitating jet will be disposed below the height of the return riser 55. When the pump 25 is turned off, the water level in the bowl 15 will recede to the level of the agitating jet 105 because of back-flow. To preclude this effect, the invention may further comprises a back-flow preventer 42 disposed in the line with the pressure hose 40. The back-flow preventer 42 prevents siphoning of water present in the bowl 15 so that the water level can be maintained at the height of the return riser 55 when the pump 25 is turned off.

FIG. 1A is a pictorial depiction of the capillary action found at the entry of a return riser comprising one example embodiment of the present invention. Once particulate matter is either floating on the surface or has been forced to the surface by an agitating stream of water 110, it passes into the water return path 56 formed by the return riser 55. The return riser 55 exhibits a capillary effect with respect to water flowing from the bowl 15 into the return path 56. This capillary effect allows particulate matter to flow freely over the perimeter of the return riser 55. The agitating stream of water 110 promotes the passage of particular matter into the return path 56 because agitation of water in the bowl 15 causes irregularities in the surface tension of the water present in the bowl 15. This, of course, causes variations in the level of capillary action.

Figure 2:
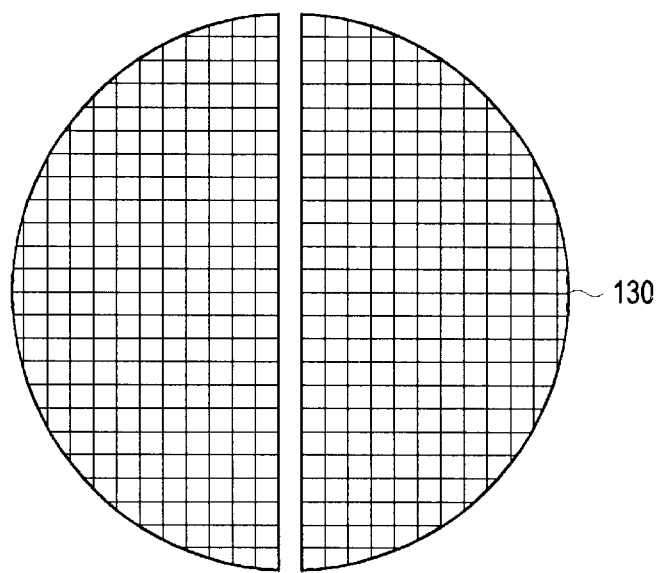
FIG. 2 is a pictorial view depicting the structure of a split support grate used in one example embodiment of the present invention.

FIG. 2 is a pictorial view depicting the structure of a split support grate used in one example embodiment of the present invention. In the example embodiment of a pedestal as described here, the circular geometry of the pedestal and the use of contoured ledges to support the grates used to support the filters and pump precludes the use of one-piece support grates. Accordingly, each support grate is split into two semi circles 130. Each semi circles is physically small enough to pass through the opening of the pedestal 10 and can then be positioned onto either the first or second contoured ledges (80 and 85 respectively). The support grates used in this example embodiment of the present invention are fabricated from a polystyrene plastic and comprise a mesh of approximately one-half of an inch. Again, the actual structure of the support grates is not pertinent to the utility of the invention as specified herein. Any suitable support mechanism may be applied.

Figure 3:
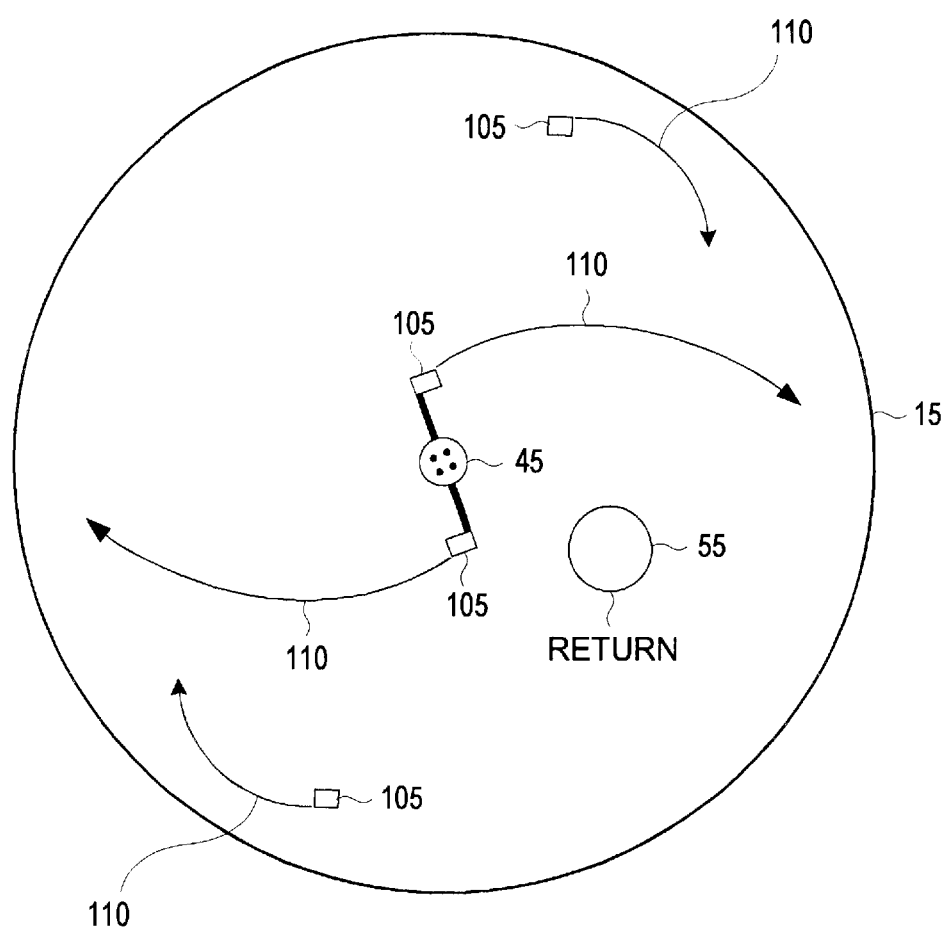
FIG. 3 is a pictorial representation of the top view of a shallow bowl according to one example embodiment of the present intention.

FIG. 3 is a pictorial representation of the top view of a shallow bowl according to one example embodiment of the present intention. According to this example embodiment, the sprinkler assembly 45 is disposed approximately in the center of the shallow bowl 15. Again, the actual location of the sprinkler assembly 45 can be varied. In this illustrative embodiment, the return riser 55 is offset from the center of the bowl 15. Again, the actual placement of the return riser 55 can be varied. For the sake of manufacturing convenience, an agitating jet 105 is made as an appendage to the sprinkler assembly 45. The actual placement of any agitating jet 105 can be varied in order to maximize the effectiveness of a water stream 110 emanating from the jet. Hence, agitating jets 105 may be placed anywhere in the bowl 15 either proximate to the center of the bowl or around its periphery or anywhere where the efficacy of water agitation can be maximized.

Figure 4:
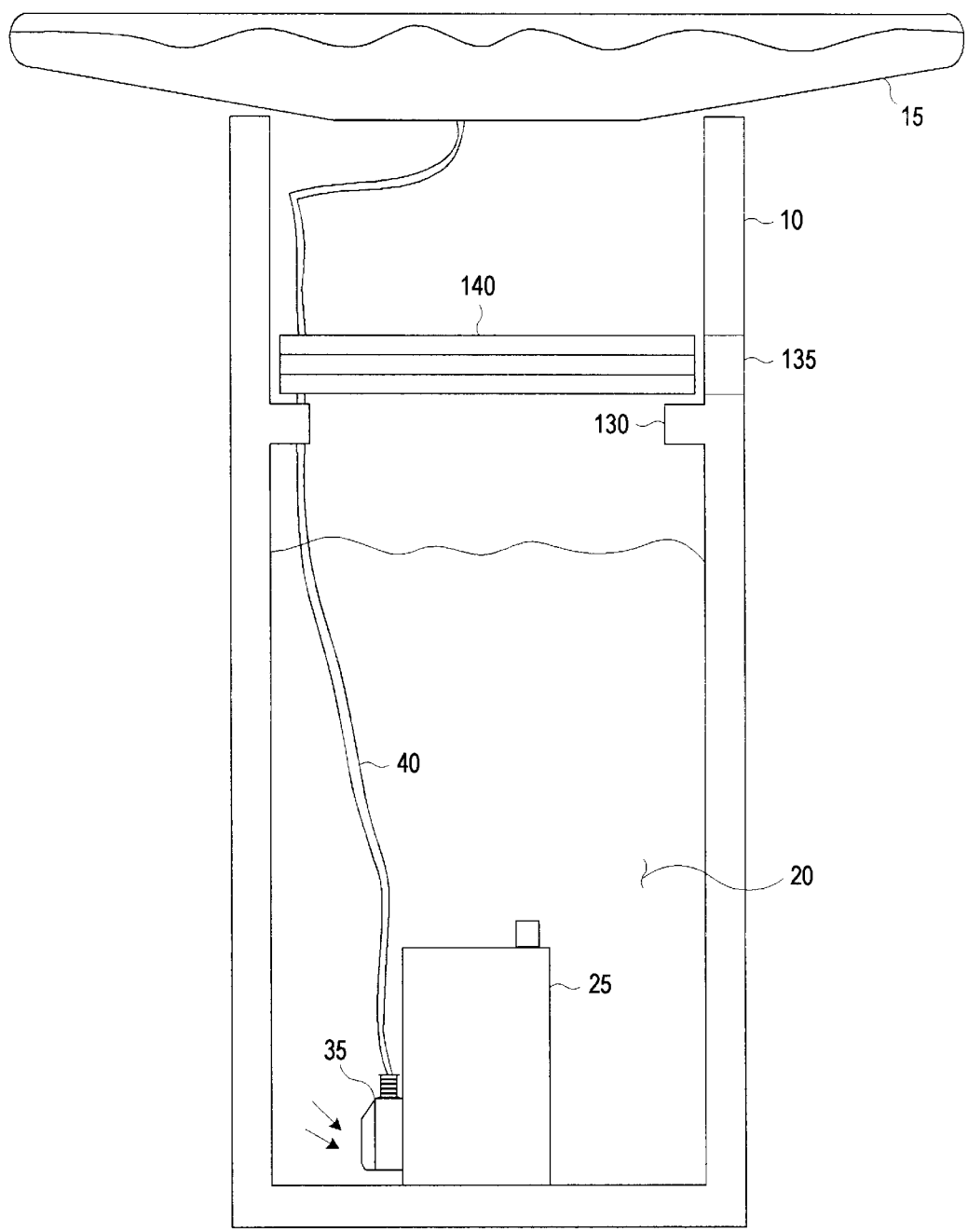
FIG. 4 is a cross-section of a simplified pedestal according to another example embodiment of the present invention.

FIG. 4 is a cross-section of a simplified pedestal according to another example embodiment of the present invention. In this simplified version of the present invention, the pedestal 10 comprises a linear profile and further comprises a single support ledge 130. In this simplified embodiment, the pump 25 is disposed at the bottom of the main reservoir 20. Akin to the first illustrative embodiment described herein, the pump 25 receives water from the main reservoir 20 through an inlet 35. The pump 25 discharges pressurized water through a pressure hose 40 that delivers the pressurized water to the shallow bowl 15. In this illustrative embodiment, the pedestal 10 may further comprise a filter replacement slot 135. The invention according to this illustrative embodiment further comprises a filter cartridge 140 that is disposed above the main reservoir 20 being supported by the single support ledge 130. Accordingly, the filter cartridge 140 may be inserted through the filter replacement slot 135 in order to facilitate replacement of the filter system. In this alternative example embodiment, the filter cartridge 140 may comprise a particulate filter and/or a sanitizing filter commensurate with the specification thus far provided.

In this illustrative embodiment, replacement of the filter can be accomplished through the filter replacement slot 135. In other embodiments that do not provide such a slot, the shallow bowl 15 must be removed to gain access to the filter disposed above the water reservoir. Hence, the shallow bowl must be a separate assembly so that it can be removed from the pedestal. In those embodiments that comprise the filter replacement slot 135, the shallow bowl may be made integral with the pedestal forming a single piece birdbath.

Various materials can be utilized in the construction of a birdbath according to the methods and apparatus described herein. In one example embodiment, the shallow bowl 15 and the pedestal 10 comprises a baked ceramic material. Either the shallow bowl 15 or the pedestal 10 may be constructed of plastic, Bakelite, metal, fiberglass or any other suitable structural material.

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents. Some, but by no means all of the possible alternatives are described herein.

I claim:

1. A method for providing water to a bird bath bowl comprising the steps of:
   receiving water from a reservoir;
   pressurizing the water;
   delivering the water to the bird bath bowl;
   receiving water proximate to the surface of the water from the bird bath bowl;
   directing the water downward away from the bird bath bowl;
   directing the water through a filter disposed above the reservoir; and
   allowing the water to exit the filter and return to the reservoir.

2. The method of claim 1 wherein the step of delivering water to the bird bath bowl comprises the step of causing the water to cascade as a shower into the bowl.

3. The method of claim 1 wherein the step of directing the water through a filter disposed above the reservoir comprises the step of directing the water through a particulate filter.

4. The method of claim 1 wherein the step of directing the water through a filter disposed above the reservoir comprises the step of directing the water through a sanitizing filter.

5. The method of claim 1 wherein the step of receiving water from the bird bath bowl comprises the steps of:
   agitating the water in the bowl; and
   receiving water from a region proximate to the surface of the water in the bowl.

6. A birdbath comprising:
   bowl for holding water comprising a water return riser that allows water to be directed downward through the bowl; and
   pedestal that supports the bowl and comprises:
      a reservoir for holding a volume of water;
      a pump that receives water from the reservoir and directs the water under pressure to the bowl; and
      a filter disposed above the reservoir that receives water from above the pedestal and directs filtered water to the reservoir.

7. The bird bath of claim 6 wherein the bowl further comprises a sprinkler assembly capable of receiving pressurized water and creating a cascading shower that is directed into the bowl.

8. The bird bath of claim 6 wherein the bowl further comprises an agitating jet disposed in the bowl capable of receiving pressurized water and agitating water that may be present in the bowl.

9. The bird bath of claim 6 wherein the bowl further comprises a sprinkler-agitator assembly capable of receiving pressurized water and creating a cascading shower that is directed into the bowl and agitating water proximate to the bottom of the bowl.

10. The bird bath of claim 6 wherein the water return comprising the bowl comprises a return riser that causes water proximate from the surface of water held in the bowl to be directed downward through the bowl.

11. The bird bath of claim 6 wherein the pedestal further comprises a back-flow preventer that is disposed between the pump and the bowl that prevent water from flowing from the bowl to the pump when the pump is not operating.

12. The bird bath of claim 6 wherein the pedestal further comprises:
   a filter support grate that supports the filter; and
   a first ledge that supports the filter support grate above the reservoir.

13. The bird bath of claim 6 wherein the pedestal further comprises:
   a pump support grate that supports the pump; and
   a second ledge that supports the pump support grate above a sump region comprising the reservoir.

14. The bird bath of claim 6 wherein the filter comprises a particulate filter.

15. The bird bath of claim 6 wherein the filter comprises a sanitizing filter.

16. The bird bath of claim 6 wherein the pedestal further comprises a filter replacement slot disposed in the side of the pedestal that allows access to the filter.

* * * * *